(12) United States Patent
Cook et al.

(10) Patent No.: US 8,743,426 B2
(45) Date of Patent: Jun. 3, 2014

(54) IMAGE ENHANCEMENT METHODS

(75) Inventors: Gerald P. Cook, Bromsash (GB); Anthony D. Jacques, Hampshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 70 days.

(21) Appl. No.: 13/534,757

(22) Filed: Jun. 27, 2012

(65) Prior Publication Data

US 2014/0002723 A1    Jan. 2, 2014

(51) Int. Cl.
*H04N 1/40* (2006.01)
(52) U.S. Cl.
USPC .......................... 358/3.27; 358/3.15; 382/199
(58) Field of Classification Search
USPC ................ 358/1.9, 2.1, 3.15, 3.27, 509, 475; 382/199, 210–211, 266, 269
See application file for complete search history.

(56) References Cited

U.S. PATENT DOCUMENTS

| | | | |
|---|---|---|---|
| 6,088,470 | A | 7/2000 | Camus |
| 6,088,612 | A | 7/2000 | Blair |
| 6,269,169 | B1 | 7/2001 | Funk et al. |
| 6,288,842 | B1 | 9/2001 | Florczak |
| 7,136,537 | B2 | 11/2006 | Pilu |
| 2003/0170425 | A1 | 9/2003 | Mann |
| 2004/0047491 | A1 | 3/2004 | Rydbeck |
| 2008/0084499 | A1 | 4/2008 | Kisacanin et al. |
| 2009/0002774 | A1 | 1/2009 | King |

FOREIGN PATENT DOCUMENTS

| | | |
|---|---|---|
| EP | 1 968 010 | 2/2008 |
| EP | 1 349 487 | 9/2009 |
| EP | 2 339 534 | 11/2009 |
| WO | WO 99/38121 | 7/1999 |
| WO | WO 02/49506 | 6/2002 |

OTHER PUBLICATIONS

PCT International Search Report from PCT/US2013/044113 mailed on Aug. 22, 2013, 4 pages.
3M™ AT9000 Full Page Reader, Technical Data Sheet, Issued May 31, 2011, 4 pages.
Seibert, J. Anthony et al., "Flat-field correction technique for digital detectors", The International Society for Optical Engineering 1998 SPIE, vol. 3336, 1998, pp. 348-354.
Feris, Rogerio et al., "Specular Reflection Reduction with Multi-Flash Imaging", Computer Graphics and Image Processing, Proceedings, 17th Brazilian Symposium on Curitiba, Oct. 17, 2004, pp. 316-321.
Jiang, Li Chang et al., "Reducing Specular Reflection Components of Chrome-Plated Surface with Varying Light Direction", Information Assurance and Security, Fifth International Conference on IEEE, Aug. 18, 2009, pp. 725-728.

*Primary Examiner* — Thomas D Lee
*Assistant Examiner* — Stephen M Brinich
(74) *Attorney, Agent, or Firm* — Sandra K. Nowak

(57) ABSTRACT

Methods of image enhancement are disclosed. In one aspect, the method of image enhancement is for use with an image capture device, such as a security document reader, for the attenuation, separation or reduction of reflections from objects, such as security documents.

14 Claims, 4 Drawing Sheets

18  
AAAAAAA

19  
AAAAAAA

20  
AAAAAAA

21  
AAAAAAA

IMAGE ENHANCEMENT METHODS

BACKGROUND

In recent years there has been widespread adoption of automated reading of security documents at border entry points and other situations where the identity of a document holder requires verification. Automated reading ranges from an optical scan of OCR-readable data to the interrogation of an RFID chip within a passport or identification card, which may then involve further checking by an operator or verification by an automated system such as an e-passport gate as found in major airports. Data may also be contained in a magnetic strip or transferred wirelessly depending on the format of the document in which identity information is contained.

Optical reading of a security document is typically carried out with document readers using one or a combination of visible, infrared and ultraviolet light, depending on the information being retrieved. Often overt and covert optical security features, such as those discussed above, are included within security documents to allow the document itself to be authenticated as genuine. As discussed, covert security features may only be visible under certain illumination, such as infrared or ultraviolet light, or may, such as with an optically variable device, provide variable information when illuminated from different directions. In each case the security document is typically read by placing the document on a glass platen of a document reader, such that the information contained on the portion of the document in contact with the platen is illuminated from within the document reader. Light reflected by the document is reflected back into the reader and processed to form an image of the information (e.g. text or covert or overt security features) required. The quality of the image captured is affected greatly by the manner in which the document reflects the incident light.

A variety of security readers are known in the art. For example, U.S. Pat. No. 6,288,842, "Security Reader for Automatic Detection of Tampering and Alteration, (Mann) discloses a security reader for reading and processing information about security laminates. One example of a passport reader is commercially available from 3M Company based in St. Paul, Minn., as the 3M™ Full Page Reader.

Image enhancement by removal of unwanted reflections in image capture devices is disclosed in U.S. Pat. No. 7,136,537, "Specular Reflection in Captured Images," (Pilu et al.). In order to remove specular reflections, two images are taken, one containing specular reflections and one where such reflections are absent. These images are blended together to create an image with reduced specular reflection, allowing underlying features to be seen. The apparatus used to achieve this effect is provided with an adjustor that is able to vary the amount of specular reflection appearing in the final image. Images are taken with one or more strobes or flashes from various directions relative to the object being imaged, and relies on each image having an absence of glare patches seen in another image. Such a method therefore takes into account reflections generated by ambient light conditions, and is not suitable for use in a document reader, for example, where illumination is well controlled and reflection features are generated by artefacts in the document being imaged, rather than artefacts generated by variations in ambient illumination.

SUMMARY

One aspect of the present invention provides an image enhancement method for an image capture device. This method comprises: illuminating an object placed on, in or adjacent to the image capture device and capturing an image of the object from a first position to obtain a first set of raw pixel data; illuminating the object placed on, in or adjacent to the image capture device and capturing an image of the object from a second position, to obtain a second set of raw pixel data, wherein each pixel in the second set of raw pixel data corresponds to a pixel in the first set of raw pixel data representing a point on the object; calibrating each of the first and second sets of raw pixel data using a set of image calibration pixel data to create a first set of image pixel data and a second set of pixel image data; and calculating a first set of final image data by: comparing the first and second sets of image pixel data; for pixels representing the same point on the object, selecting the pixel with the lowest pixel intensity; and including said pixel in the first set of final image data.

The above summary of the present invention is not intended to describe each disclosed embodiment or every implementation of the present invention. The Figures and the detail description, which follow, more particularly exemplify illustrative embodiments.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
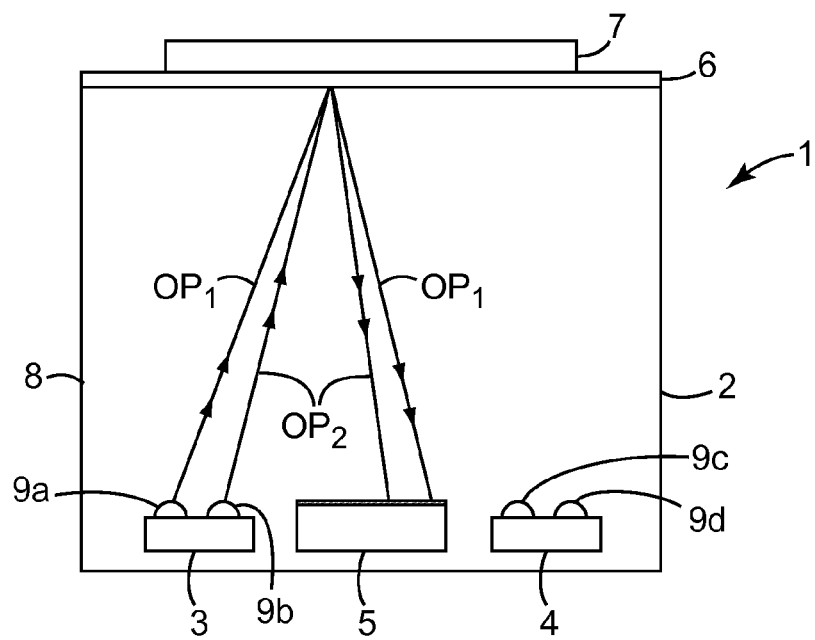
FIG. 1 is a schematic side view of a document reader in which an embodiment of the method of the present invention is carried out.

Security documents such as passports, identification cards, and the like, may often have either a matte or a shiny finish, and is unlikely to be completely flat. During use, corners of plastic bio-data pages in passports, for example, may bend, air bubbles and dirt may become trapped within a laminate structure, or a surface material may be highly reflective and shiny in appearance, all of which can create unwanted reflections, generally specular reflections, thus distorting the captured image. This may make machine readable text, such as OCR text, overt and covert security features difficult to read, and make automatic authentication of the document and/or verification of the holder unreliable or impossible. For example, a bio-data page having a laminate construction with an extremely shiny surface may require additional inspection by an operator if specular reflections distort the image beyond the capability of an automatic reader.

With the various constraints on security document imaging in mind, there is a need for a method that allows the image taken by a standard security document reader to be enhanced sufficiently that stray and unwanted reflections are no longer an issue, such that the document can be authenticated reliably and accurately regardless of surface quality or illumination conditions. Such a method may also find applications in other image capture techniques.

The present invention aims to address these issues by providing an image enhancement method for an image capture device; the method comprising the steps of: a) illuminating an object placed on, in or adjacent to an image capture device and capturing an image of the security document from a first position to obtain a first set of raw pixel data; b) illuminating the object placed on in or adjacent to an image capture device and capturing an image of the object from a second position to obtain a second set of raw pixel data, where each pixel in the second set of raw pixel data corresponds to a pixel in the first set of raw pixel data representing a point on the object; c) calibrating each of the first and second sets of raw pixel data using a first set of image calibration pixel data to create a first set of image pixel data and using a second set of image calibration pixel data to create a second set of pixel image data respectively, where each pixel in the second set of image calibration pixel data corresponds to a pixel in the first set of image calibration pixel data, and each pixel in the first and second sets of image calibration pixel data corresponds to a pixel in each of the first and second sets of raw pixel data respectively; d) for the first pixel in the first set of image pixel data: i) processing the first set of image pixel data to detect whether the pixel represents an edge feature; ii) if an edge feature is detected using the first pixel as an output pixel; iii) if neither the first pixel nor the corresponding pixel represents an edge feature, determining whether the first pixel or the corresponding pixel are within a region bounded by an edge, and if so using the one of the first pixel or the corresponding pixel with the lowest pixel intensity as the output pixel; iv) if neither the first pixel nor the corresponding pixel are within a region bounded by an edge, determining the one of the corresponding pixel in the first set of image calibration pixel data and the corresponding pixel in the second set of image calibration pixel data having the highest pixel intensity, and selecting the corresponding pixel in either the first set of image pixel data or the second set of image pixel data as the output pixel; and e) repeating steps i) to iv) for each pixel in the first set of image pixel data and forming a set of final pixel data from the resulting output pixels.

The advantage of using such an approach is that only pixels representing a portion of an image in which a reflection is absent are used to make up the set of final image data, thus ensuring that any image recovered is of a high quality with reflections either attenuated or removed. In some circumstances, reflections may in fact be separated, for example, specular reflections are removed but reflections from single color features remain. This is particularly advantageous for a security document, such as an identification document or a fiduciary document, where covert or overt security features may be revealed as single color reflections.

In one aspect of the present invention, the detection of an edge feature is carried out using filter techniques.

In another aspect of the present invention, the object is illuminated with one of visible light, infra-red light and ultra-violet light. More preferably, when the object is illuminated with visible light, the object is illuminated with white light.

The method may further comprise the step of adjusting the first and second sets of image pixel data with a gamma correction.

In another aspect of the method of the present invention, the image enhancement output is the attenuation, separation or removal of reflections. Preferably, the image enhancement output is the attenuation, separation or removal of specular reflections.

In another aspect of the method of the present invention, the method may further comprise the step of: for each of the first and second sets of raw pixel data, compensating the intensity values of each pixel for ambient light. In one particular aspect of this embodiment, the method may further comprise the step of: creating a set of ambient pixel data by imaging the object under no illumination other than ambient light; and subtracting the set of ambient pixel data from each of the first and second sets of raw pixel data.

Preferably, the object is a security document and the image capture device is a security document reader. More preferably, the security document is an identity document or a fiduciary document. Yet more preferably, the security document is one of a passport, an identification card or a driver's license.

In the present invention, image enhancement including edge detection techniques have been created to form an image of an object, such as a security document, that is substantially free of unwanted reflections, as explained in further detail below. One embodiment of the method of the present invention comprises illuminating an object placed on, in or adjacent to an image capture device such as a security document reader, so as to capture an image of the object from a first position to obtain a first set of raw pixel data. Next, illuminating the object placed on, in or adjacent to the image capture device, and capturing an image of the object from a second position, different to the first position. This is to obtain a second set of raw pixel data, where each pixel in the second set of raw pixel data corresponds to a pixel in the first set of raw pixel data representing a point on the object. Since there is a positional difference in the two images, calibrating each of the first and second sets of raw pixel data is preferable. This calibration is performed using a first set of image calibration pixel data to create a first set of image pixel data and using a second set of image calibration pixel data to create a second set of pixel image data respectively, where each pixel in the second set of image calibration pixel data corresponds to a pixel in the first set of image calibration pixel data, and each pixel in the first and second sets of image calibration pixel data corresponds to a pixel in each of the first and second sets of raw pixel data respectively. At this point, it is preferable to carry out an operation to detect the edges of any reflections present and produce an enhanced image of the object. Starting with a first pixel in the first set of image pixel data, the first set of image pixel data is processed to detect whether the pixel represents an edge feature. If an edge feature is detected, the first pixel is used as an output pixel. If an edge feature is not detected, the second set of image pixel data is processed to detect whether the corresponding pixel represents an edge feature. If an edge feature is detected, then said corresponding pixel is used as an output pixel. If neither the first pixel nor the corresponding pixel represents an edge feature, then a determination of whether the first pixel or the corresponding pixel are within a region bounded by an edge is carried out. If this is the case, the one of the first pixel or the corresponding pixel with the lowest pixel intensity is used as the output pixel. If neither the first pixel nor the corresponding pixel represents either an edge feature or is within a region bounded by the edge, the one of the corresponding pixel in the first set of image calibration pixel data and the corresponding pixel in the second set of image calibration pixel data having the highest pixel intensity is determined. This pixel is then selected as the output pixel. These steps are then repeated for sufficient pixels in the first set of image pixel data, so as to render an image from a set of final pixel image data formed from the resulting output pixels.

By using such an edge detection technique of the present invention, an image substantially without reflections is revealed. Such a method is particularly suitable for use with a security document. By attenuating, separating or removing unwanted reflections, in particular, specular reflections, the reliability of image processing of an object, such as the automated authentication of a security document, is improved.

In the following embodiments the example of a security document and security document reader is used. However in alternative embodiments, the method of the present invention is suitable for use with other objects and image capture devices.

FIG. 1 is a schematic side view of a document reader in which an embodiment of the method of the present invention is carried out. The document reader 1 is generally cuboid in shape, and comprises a housing 2 in which first 3 and second 4 illumination sources and an image capture device 5 are positioned. The uppermost surface of the housing 2 is formed from a glass platen 6, onto which a security document 7 may be placed in order to be imaged. In this embodiment, in order to enable illumination of the document from a first and a second direction, the first 3 and second 4 lighting sources are positioned on either side of the image capture device 5, which is disposed centrally within the housing 2 adjacent a wall 8 of the housing. Each illumination source 3, 4 is provided with a linear array of light emitting diodes 9a, 9b, 9c, 9d (only two of which are shown on each of the first 3 and second 4 lighting sources for clarity), aligned to illuminate the entire surface of a security document 7 in contact with the glass platen 6. Light travels along the optical paths $OP_1$ and $OP_2$ to be incident on the glass platen 6 and document 7, and reflected back to the surface of the image capture means 5. Non-limiting example optical paths are shown for the first illumination source 3 only. Second illumination source 4 may include similar optical paths, although not illustrated. Preferably the light emitting diodes emit light in the visible range of the electromagnetic spectrum, with suitable LEDs being available from Osram Opto Semiconductors under the product code "TOPLED Ultra White 2PLCC". The image capture device 5 is preferably a CMOS device, such as the MT9T001 ½ inch 3-megapixel digital image sensor, available from Micron Technologies, Inc., located in Boise, Id., USA.

Figure 2:
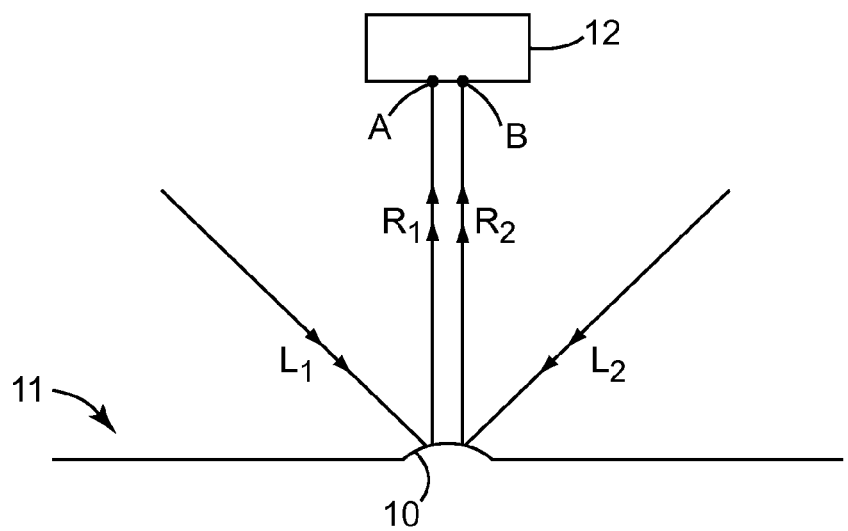
FIG. 2 is a schematic side view of one type of optical defect in a security document giving rise to a specular reflection.

The document reader 1 illustrated in FIG. 1 is arranged so as to enable a method involving imaging a security document from a first and a second direction, where the second direction is different from the first direction. Using two different illumination directions allows images of the same point on the security document to be taken that yield different optical effects. This is generally illustrated in FIG. 2. FIG. 2 is a schematic side view of an optical defect in a security document giving rise to a specular reflection. Specular reflections may be anything that includes an optical glare reflecting back from a surface. Examples of specular reflection in a security document may be caused an uneven laminate, uneven surface that is not optically flat, or the material itself, such extra shiny laminates. In general, specular reflections are mirror or glass-like reflections. In the case of a security reader, there are artifacts or material properties in the security laminates of a security document that cause bright white spots where the light from the light source(s) is reflected back to the image capture device. As one example, an optical defect 10 is present in the surface of a security document 11, in this case, a bubble in a laminated bio-data page structure. Light from a first direction $L_1$ is incident on a first side of the defect 10 and reflected $R_1$ onto an image capture device 12. This gives an image with a bright spot corresponding to reflection from the surface of the defect 10 on which the light $L_1$ was incident. Light from a second direction $L_2$ is incident on a first side of the defect 10 and reflected $R_2$ onto an image capture device 12. This gives an image with a bright spot corresponding to reflection from the surface of the defect 10 on which the light $L_2$ was incident. These two images of the same section of the security document 11 will appear to be subtly different when compared to each other. When light reflected from the defect 10 is incident on the image capture device 12, different pixel intensities for the same point on the security document are obtained as follows. The image capture device 12 contains an array of cells each of which has a one-to-one relationship with a pixel in an image of the security document 11. When illuminated from a first direction with light $L_1$ the first set of raw pixel data obtained will contain a bright pixel at the point where the reflection $R_1$ is incident on the image capture device, at position A. When illuminated from a second direction with light $L_2$ the second set of raw pixel data obtained will contain a bright pixel at the point where the reflection $R_2$ is incident on the image capture device, at position B. When these two data sets are combined the darkest pixel (e.g. the pixel with the lowest pixel intensity measured for each equivalent pixel) will be found in the second raw pixel data set at point A and in the first raw pixel data set at point B. Each pixel in the second set of raw pixel data corresponds to a pixel in the first set of raw pixel data representing a point on the security document.

Figure 3A:
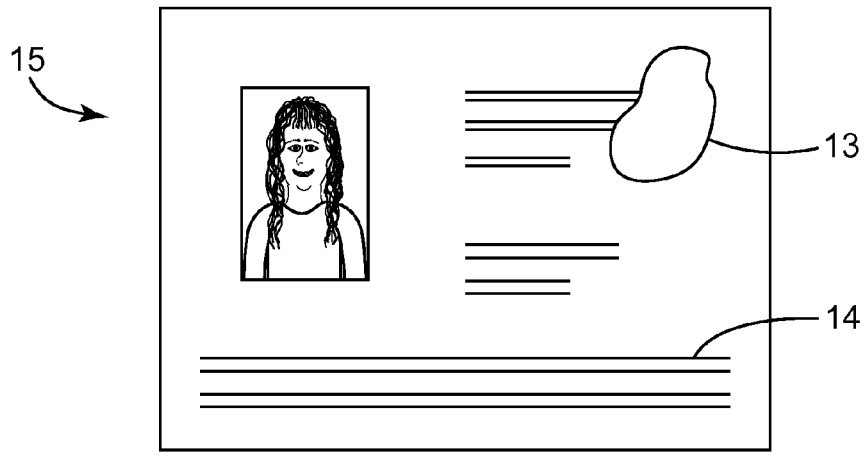
FIG. 3A is a schematic illustration of an image of a passport bio-data page illuminated from a first direction to show a first reflection feature.
Figure 3B:
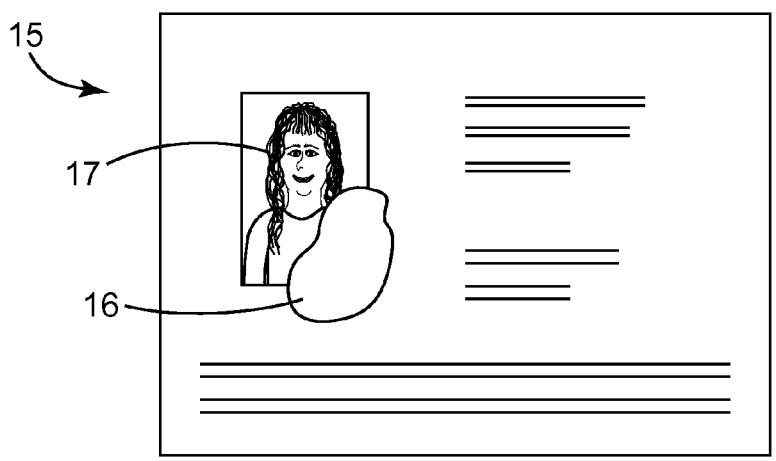
FIG. 3B is a schematic illustration of an image of a passport bio-data page illuminated from a second direction to show a second reflection feature.
Figure 3C:
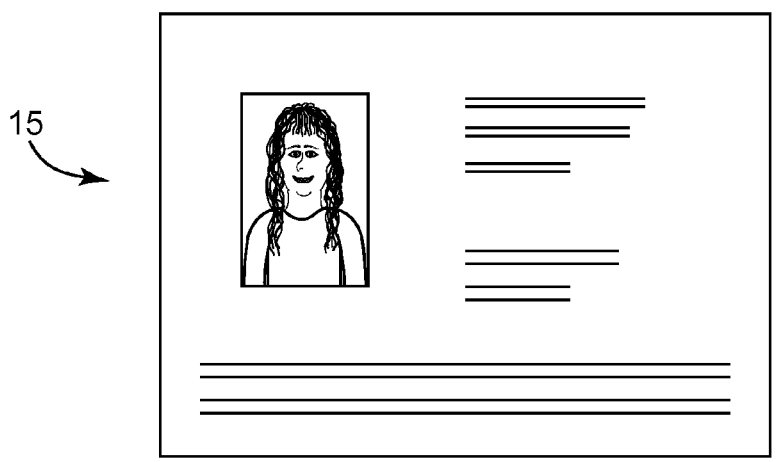
FIG. 3C is a schematic illustration of an image of the passport bio-data page of FIGS. 3A and 3B with no reflection features visible.

This idea is illustrated further in FIGS. 3A, 3B and 3C. FIG. 3A is a schematic illustration of an image of a passport bio-data page illuminated from a first direction $L_1$ to show a first reflection feature. A bio-data page is chosen in this example as typically this is comprised of a multilayer laminated structure with at least one plastic or reflective layer or region on the page containing identity information about the passport bearer. However, the method described below is equally suitable for any page or surface of a security document that requires imaging for bearer identification and/or document authentication to take place. The first reflection feature 13 is a specular reflection obscuring a portion of text 14 on the bio-data page 15. This is caused, for example, by a defect within the laminated structure of the bio-data page 15. FIG. 3B is a schematic illustration of an image of a passport bio-data page illuminated from a second direction $L_2$ to show a second reflection feature. The second reflection feature 16 is a specular reflection obscuring a portion of the photograph 17 of the holder of the bio-data page 15. This is caused, for example, by the inclusion of a reflective covert security feature within the bio-data page 15. Each reflection is bounded by an edge, with the region corresponding to the reflection being fully within the edge. Typically this edge is easily detectable as described in more detail below. FIG. 3C is a schematic illustration of an image of the passport bio-data page of FIGS. 3A and 3B with no reflection features visible. This image is formed from a comparison of the two images in FIGS. 3A and 3B and using an edge detection technique to select pixels revealing a reflection free image.

In order to utilise an edge detection approach to its fullest extent, it is desirable to ensure that the data collected in the first and second raw pixel data sets is as accurate as possible.

To achieve this, two factors must be born in mind. Firstly, a document reader, such as a security document reader, has a limited footprint due to size restrictions in the environment in which it is used, which would typically be a desk or cubicle at a border inspection point. This then places constraints on the optical system within the document reader, as to enable illumination of an entire security document placed on the reader lighting source(s) often need to be positioned adjacent a wall or corner of the housing of the document reader, as in the example given above. This causes a variation in the intensity of illumination of the security document with distance away from the lighting source, and consequently a spatial distribution of pixel intensity in image obtained. Secondly, the image capture device typically has an inherent non-linear response to intensity of illumination and color, leading to a variation between a real intensity for a particular shade and an ideal intensity for the same shade. For a methodology that relies on being able to select a pixel using a variety of criteria, any discrepancy in illumination and/or color definition can have a detrimental effect on the data unless corrected.

Figure 4:
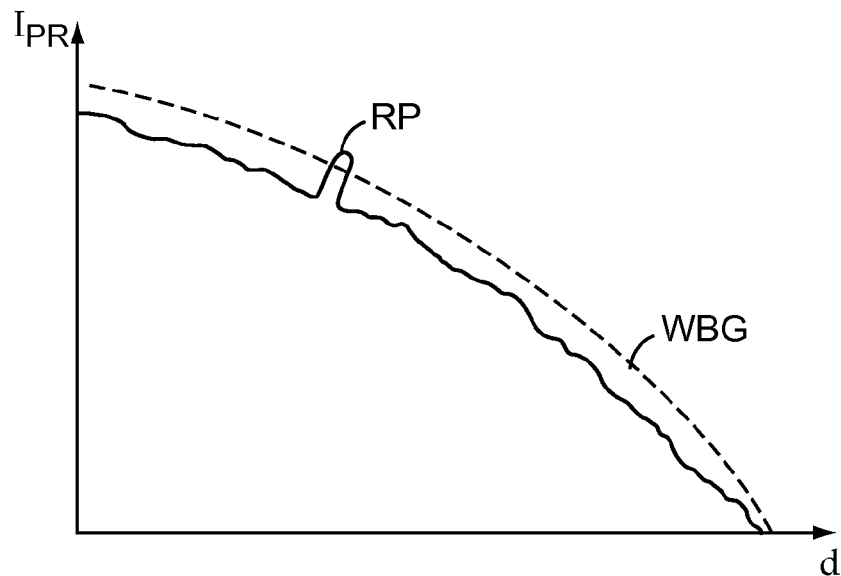
FIG. 4 is a chart illustrating the pixel intensity of a raw pixel data set $I_{PR}$ against distance d from the source of illumination.

FIG. 4 is a chart illustrating the pixel intensity of a raw pixel data set $I_{PR}$ against distance from the source of illumination d. This illustrates the effect of the spatial distribution of the light emitted from the lighting sources 3, 4, within the document reader 1 and incident on the security document 7. In this example, the lighting source 3 is positioned adjacent d=0, such that the highest pixel intensity of raw pixel data $I_{PR}$ occurs at this point. As the distance d away from the lighting source 3 increases the pixel intensity drops off substantially following a mean inverse square approximation. The relationship shown is appropriate for two lighting sources, whereas for a greater number of lighting sources, the resulting intensity relationship is created using a mean inverse square approach resulting in a saddle-shaped intensity distribution. In this example, approximately half-way between the highest and lowest pixel intensities a reflection peak RP is seen. However, given the general noise within the data and the decreasing pixel intensity with distance d in this position it is likely that the reflection peak would be detected. However, a peak found at an increased value of d, and therefore further into the region of decreasing pixel intensity may be harder to detect due to noise, and therefore calibration of the raw pixel data to avoid this is advisable.

This variation in pixel intensity can be corrected using a set of calibration pixel data. Each of the first and second raw pixel data sets will have an intensity distribution similar to that shown in FIG. 4. Also shown on FIG. 4 is a line marked "WBG" representing white background intensity. This is effectively the pixel intensity for a plain white background, such as a sheet of white paper or card, imaged using the document reader 1. By allocating pixel intensity in the WBG to represent the background value of pixel intensity in the raw pixel data sets, a set of calibration pixel data is created. When this set of calibration pixel data is combined with the raw pixel data in a mathematical operation as shown in Equation 1 below the pixel image data is returned:

$$\text{Output} = (255 \times \text{Input})/(WBG + c) \quad \text{Equation 1}$$

Output=output pixel intensity in pixel image data
Input=input pixel intensity in raw pixel data
255=maximum intensity value allocated to the cell in the image capture device
WBG=intensity of corresponding pixel in calibration pixel data
c=constant, greater than 0 and preferably 1, included to ensure that the Output value is not infinite.

Figure 5:
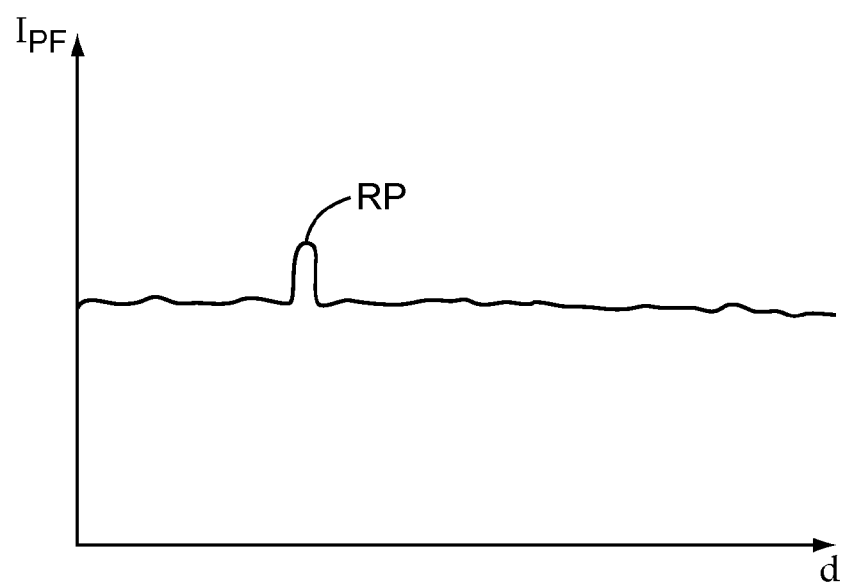
FIG. 5 is a chart showing the final pixel intensity $I_{PF}$ of the pixels in the first set of pixel image data (as an example) against distance d from the source of illumination.

This operation is completed for both the first set of raw pixel data and the second set of raw pixel data to obtain the first and second sets of image pixel data, respectively. FIG. 5 is a plot showing the final pixel intensity $I_{PF}$ of the pixels in the first set of pixel image data (as an example) against distance from the source of illumination d. It can be seen that the background intensity is now substantially flat with increasing distance, and the reflection peak RP seen clearly above the background intensity, allowing the darkest pixel to be chosen easily and accurately. Since the two sets of raw pixel data are different, calibrating each of the first and second sets of raw pixel data comprises using a first set of image calibration pixel data to create a first set of image pixel data and using a second set of image calibration pixel data to create a second set of pixel image data, respectively. Each pixel in the second set of image calibration pixel data corresponds to a pixel in the first set of image calibration pixel data, and each pixel in the first and second sets of image calibration pixel data corresponds to a pixel in each of the first and second sets of raw pixel data, respectively.

The calibrated first and second sets of image pixel data may then be used to calculate a first set of final image data by using an edge detection technique to select between corresponding pixels in an image of the same point on the image of the security document. Effectively this results in the subtraction of one set of image pixel data from another, leaving only the edges of a reflection within the image, requiring a determination of whether other pixels are within the reflection bounded by the edge or outside the reflection. Starting with a first pixel in the first set of image pixel data, the first set of image pixel data is processed to detect whether the pixel represents an edge feature. If an edge feature is detected, the first pixel is used as an output pixel. If an edge feature is not detected, the second set of image pixel data is processed to detect whether the corresponding pixel represents an edge feature. If an edge feature is detected, then said corresponding pixel is used as an output pixel. If neither the first pixel nor the corresponding pixel represents an edge feature, then a determination of whether the first pixel or the corresponding pixel are within a region bounded by an edge is carried out. If this is the case, the one of the first pixel or the corresponding pixel with the lowest pixel intensity is used as the output pixel. If neither the first pixel nor the corresponding pixel is within a region bounded by an edge feature, then the one of the corresponding pixel in the first set of image calibration pixel data and the corresponding pixel in the second set of image calibration pixel data having the highest pixel intensity is determined. This pixel is then selected as the output pixel. This is repeated for as many times as is necessary to form a viable and useful image, which may be for all of the pixels in the first image pixel data set or for only a subset of these pixels. The resulting image may be used in various authentication and verification processes, since any reflections in the original images are attenuated, reduced or separated to the extent that further processing operations are reliable and reproducible. Suitable edge detection techniques may include the use of filters, such as a Sobel operator or a Canny filter. A Sobel operator effectively calculates the opposite of the gradient of the pixel intensity at each pixel in an image, which results in a method of detecting the largest change in intensity from light to dark and the direction of that intensity change. This is due to the fact that the intensity at each point can be represented as a vector function, and an appropriate mathematical operator in matrix form is combined with this vector function to carry out the necessary calculations such that the rate of change in the intensity is determined in both horizontal and vertical directions. Use of the operator may indicate the presence of an edge and its likely orientation, since an edge will be represented by an abrupt change in intensity represented by a high magnitude in a gradient calculation. This may be done in greyscale or in single colors, such as RGB (red, green, blue) or L*a*b* space. A simple calculation of detecting an edge is as follows.

By assuming that the x-co-ordinate of a point in an image represented by a pixel increases from left to right and that the y-co-ordinate of the same point increases from up to down, two kernels $G_x$, $G_y$ can be created that are then combined with the original image in a convolution operation:

$$G_x = \begin{bmatrix} -1 & 0 & +1 \\ -2 & 0 & +2 \\ -1 & 0 & +1 \end{bmatrix}, G_y = \begin{bmatrix} -1 & -2 & -1 \\ 0 & 0 & 0 \\ +1 & +2 & +1 \end{bmatrix}$$

Consequently both the magnitude G and direction Θ of the intensity gradient can be calculated:

$$G=\sqrt{G_x^2+G_y^2}, \Theta=\tan^{-1}2(G_x,G_y)$$

A Canny edge filter uses similar considerations to determine the gradient of the intensity change and four operators—vertical and diagonal (both left-right and right-left) to determine the direction of the gradient. However, Canny edge filters are susceptible to noise and therefore are typically used with a blurred image produced using a first order Gaussian derivative (where a Gaussian function in matrix form is convolved with each pixel in an image). This produces a blurred image where noise effects are minimised. The edge direction angle is rounded to one of 0°, 45°, 90°, and 135° in determining direction, with a series of criteria being applied to determine if an edge is present:

- If the rounded gradient angle is 0°—a point is on an edge in the north-south direction if the gradient magnitude in the this direction is greater than the magnitudes of the west and east directions;
- If the rounded gradient angle is 45°—a point is on an edge in the north-west-south-east direction if the gradient magnitude in the this direction is greater than the magnitudes of the north-east and south-west directions;
- If the rounded gradient angle is 90°—a point is on an edge in the west-east direction if the gradient magnitude in the this direction is greater than the magnitudes of the north and south directions; and
- If the rounded gradient angle is 135°—a point is on an edge in the north-east-south-west direction if the gradient magnitude in this direction is greater than the magnitudes of the north-west and south-east directions.

The accuracy of this may be improved still further by using a differential technique in combination with the Canny filter. Other filter techniques (Roberts, Prewitt, for example) used for edge detection will be readily apparent to those skilled in the art. Where it appears that the edge is incomplete and the reflection has no clear boundary, various techniques looking at rate of change of color or intensity can be used to determine where the edge should be.

To determine whether or not a pixel lies within a reflection as bounded by an edge detected using one of the methods above, a flood fill (sometimes also known as a seed fill) algorithm can be used. This effectively creates a mask to block out a reflection, such that in a region covered by the mask the pixel chosen as the output pixel is that with the lowest intensity in either the first pixel data set or the second pixel data set. A flood fill algorithm typically looks at three parameters: a start node, a target color and a replacement color. The algorithm looks for all nodes in an array that are connected to the start node by a path of the target color, and then changes each node to the replacement color. This creates a fill effect, effectively masking an area representing a reflection. In this region therefore, either the pixel in the first pixel data set or the pixel in the second pixel data set is chosen from the set of pixel data, which did not contain the edges that were used to create the mask (thus representing a reflection-free region).

Figures 6, 7:
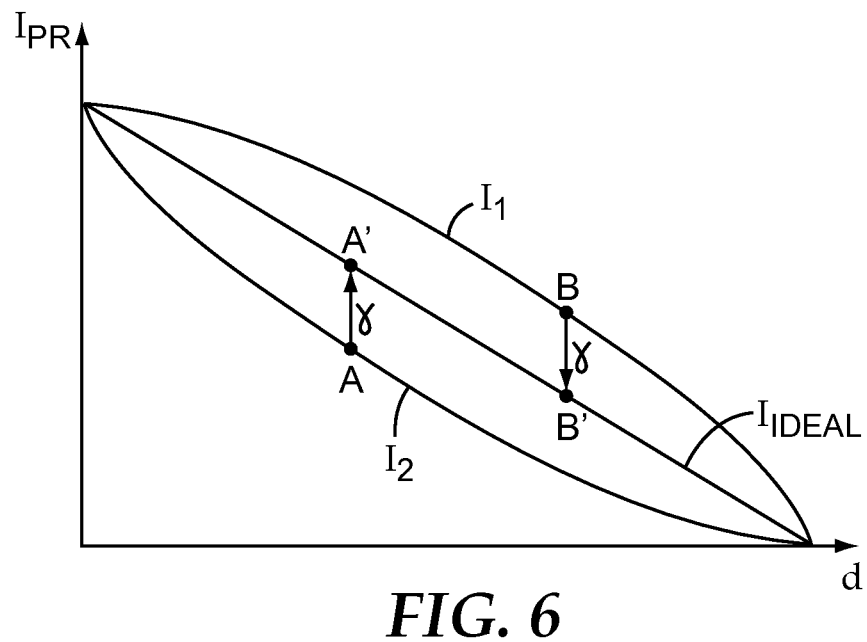
FIG. 6 is a chart showing pixel intensity $I_P$ against apparent greyness G (the response of the image capture device across the spectrum imaged) for decreasing pixel intensity.
FIG. 7 is a schematic example of the effect that gamma correction has on text within an image.

However, as is evident from FIG. 6, it may be desirable to make a further correction, such as a gamma correction, to take into account the inherent non-linear response to intensity of illumination and color, leading to a variation between a real intensity for a particular shade and an ideal intensity for the same shade. FIG. 6 is a chart showing pixel intensity $I_P$ against apparent greyness G (the response of the image capture device across the spectrum imaged) for decreasing pixel intensity. In the centre of the response range the non-linear behaviour of the image capture device is at its most stark—with the greatest deviation being either above ($I_1$) or below ($I_2$) the ideal intensity $I_{IDEAL}$. The direction in which the deviation occurs is an artefact of the image capture device used, hence both upper and lower deviations are illustrated here for the purposes of explanation. In order to ensure that the pixel intensity is as close to the ideal intensity as possible a correction factor, often known as gamma correction, is used. When applied to the pixel intensity at point A on curve $I_2$, the pixel intensity will be corrected to point A' on the line $I_{IDEAL}$, and when applied to the pixel intensity at point B on curve $I_2$, the pixel intensity will be corrected to point B' on the line $I_{IDEAL}$. Gamma correction is an exponential function typically in the form shown in Equation 2 below:

$$V_{out}=AV_{in}^\gamma \quad \text{Equation 2}$$

Where $V_{out}$ is output, $V_{in}$ is input, A is a constant and γ is the gamma exponential correction factor. A gamma correction is applied to the first set of final image data if required to ensure that the data quality in the first set of final image data is as high as possible, making it ideal as a starting point for further processing as part of a document authentication process. FIG. 7 is a schematic example of the effect that gamma correction has on text within an image. The upper line of text contains a first group of letters 18 (all letter "A") corresponding to low illumination intensity (i.e. at a large distance d from the lighting source) and thus appear all in a lighter shade of gray, and a second group of letters 19 (all letter "A") corresponding to high illumination intensity (i.e. at a small distance d from the lighting source) and thus appear all in a darker shade of gray. Both groups 18, 19 are without gamma correction. The lower line of text contains a third group of letters 20 (all letter "A") corresponding to low illumination intensity (i.e. at a large distance d from the lighting source) and a fourth group of letters 21 (all letter "A") corresponding to high illumination intensity (i.e. at a small distance d from the lighting means), both with gamma correction. The effect of gamma correction on an image is that for the letters in the third group 20 and fourth group 21 there is a greater contrast between individual shades, and a greater contrast between lighter shades (low illumination) and darker shades (bright illumination) in general (i.e. the contrast between the entire third group 20 and the entire fourth group 21).

Extraction of further image features, such as covert security features hidden within the security document being imaged or further correction and enhancement of the raw image pixel data will now be described with respect to further embodiments of the present invention.

In the examples given above, no correction is required for the effects of ambient lighting (i.e. light generated by the surrounds of the document reader rather than by the document reader), since typically document readers are used in an enclosed situation, for example, by providing a hood or lid covering the security document during illumination. However, in some circumstances, such as when a document reader is used in a booth or other open environment, it may be desirable to correct the image obtained by removing the intensity component attributable to ambient light. In a further embodiment of the present invention, this is done by creating a set of ambient pixel data by imaging the security document under no illumination other than ambient light. This may be achieved by placing the security document onto the glass platen 6 of the document reader 1 and without activating any of the lighting sources, capturing an image of the security document 7, thus creating the set of ambient pixel data. This set of ambient pixel data is then subtracted from each of the first and second sets of raw pixel data. This may be done at the same time as other calibration operations, beforehand or afterwards, but before the first or second sets of final image data are created.

Although in the embodiments above the technique was carried out using a passport bio-data page, it is also possible to image any other page of a passport, an identification card or a driver's license, as examples of identity documents. Other security documents, such as fiduciary documents (for example, credit or bank cards) may also be imaged using this technique. Processing to create the various sets of data is preferably carried out within a FPGA (field-programmable gate array) of the document reader. However, this is merely a matter of preference, and the processing could alternatively be carried out in an ASIC (application-specific integrated circuit) if desired.

In the above embodiments, images are captured from different positions, such as from different angles. This is dictated by the physical construction of a passport reader, which has a dedicated footprint limited in size due to the constraints of the areas in which such readers are often situated. A typical full page passport reader has an approximate base size of 160 mm×200 mm and a height of approximately 190 mm. The lighting sources are typically placed adjacent a side wall, approximately 50 to 70 mm away from the wall, resulting in a typical angle of illumination in the range of 10° to 60° and typically around 40° to 50° (where the angle is measured at the surface of the security document being illuminated). This is relatively wide angle illumination compared with other image capture devices, such as cameras. Consequently the first and second positions from which the security document is illuminated and the images captured from are determined by the first and second illumination angle created by the position of the first and second lighting sources. However, it is possible to create illumination and/or image capture from different relative positions without using two separate lighting sources. For example, a single image capture device can be replaced with two or more image capture devices, in conjunction with a single lighting source. Alternatively, further optical paths can be created from either a single or multiple light sources using lenses, mirrors or prisms, with each optical path yielding a relative position from which the security document may be illuminated or an image captured. Creating different relative positions from which to illuminate the security document or from which to capture images of the security document may also be achieved by moving the security document and/or the image capture device relative to each other. This could be using a motor or vibrating either the security document (for example, by moving the glass platen) or the image capture device at a fixed frequency. Creating multiple relative positions from which either the security document can be illuminated or from which images can be captured is particularly useful for identifying holographic features. Further options could also include the use of plenoptic light field cameras or the use of microlens arrays to create multiple images that appear to be imaged from multiple angles. To enhance the image quality further, it may also be desirable to use Laplacian or Gaussian smoothing functions to reduce noise or smooth the background calibration data sets.

In the embodiments described above, the approach of the present invention is applied to a security document reader to address issues involving reflections in security documents. However, the techniques may be used with other image capture devices (including, but not limited to, cameras—whether digital, video or otherwise—CMOS and CCD devices, mobile phones and other hand held devices, optical scanners, including flat bed scanners and other equipment that is capable of capturing an image) in which reflections arising from optical or physical defects or inconsistencies in the object being imaged occur. In the embodiments described above, the security document may be replaced by an object, for example a different type of document (in the case of a scanner), or a person or landscape scene (in the case of a camera). This may or may not be in contact with the image capture device, and the angle of illumination may be relatively narrow compared with the example of a passport reader above. However, illumination of the object or capture of an image of the object from at least two positions enables the darkest only pixel technique to be applied to remove reflections in images of the object. The code loops described above also apply equally well to other object types and image capture devices, since images of an object from different positions will always yield at least one image in which a reflection is present at a certain point and at least a second image where a reflection is absent at the same point, hence there will always be one bright and one dark corresponding pixel.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An image enhancement method for an image capture device; the method comprising:
    illuminating an object placed on, in, or adjacent to an image capture device and capturing an image of the object from a first position to obtain a first set of raw pixel data that includes a plurality of first set raw pixel datum;
    illuminating the object placed on, in, or adjacent to the image capture device and capturing an image of the object from a second position to obtain a second set of raw pixel data that includes a plurality of second set raw pixel datum; wherein a single area of the object is represented by a first set raw pixel datum and a corresponding second set raw pixel datum;
    calibrating each of the first and second sets of raw pixel data using a first set of image calibration pixel data to create a first set of image pixel data and using a second set of image calibration pixel data to create a second set of image pixel data respectively, wherein each pixel datum in the second set of image calibration pixel data corresponds to a pixel datum in the first set of image calibration pixel data, and wherein each first set image calibration pixel datum corresponds to a first set raw pixel datum, and each second set image calibration pixel datum corresponds to a second set raw pixel datum;

for a pixel datum in the first set of image pixel data:

i) detecting whether the pixel datum in the first set of image pixel data represents an edge feature;

ii) if the pixel datum in the first set of image pixel data represents an edge feature, using the pixel datum as an output pixel;

iii) if the pixel datum in the first set of image pixel data does not represent an edge feature, processing the corresponding pixel datum in the second set of image pixel data to determine if it represents an edge feature, and if it represents an edge feature, using said corresponding pixel datum in the second set of image pixel data as an output pixel;

iii) if neither the pixel datum in the first set of image pixel data nor the corresponding pixel datum in the second set of image pixel data represents an edge feature, determining whether the first pixel datum in the first set of image pixel data or the corresponding pixel datum in the second set of image pixel data are within a region bound by an edge, and, if so, using the one of the pixel datum in the first set of image pixel data or the corresponding pixel datum in the second set of image pixel data with the lowest pixel intensity as the output pixel;

iv) if neither the pixel datum in the first set of image pixel data nor the corresponding pixel datum in the second set of image pixel data are within a region bound by an edge, then determining the corresponding pixel in the first and second sets of image calibration pixel data having the highest pixel intensity, and using as the output pixel the corresponding pixel in the image pixel data that corresponds to this calibration pixel; and repeating steps i) to iv) for each pixel datum in the first set of image pixel data and forming a set of final pixel data from the resulting output pixels.

2. The image enhancement method of claim 1, wherein the detection of an edge feature is carried out using filter techniques.

3. The image enhancement method of claim 1, wherein the object is illuminated with visible light, infra-red light or ultra-violet light.

4. The image enhancement method of claim 3, wherein when the object is illuminated with visible light, the object is illuminated with white light.

5. The image enhancement method of claim 1, further comprising:
adjusting the first and second sets of image pixel data with gamma correction.

6. The image enhancement method of claim 1, further comprising:
attenuating, separating, or removing reflections.

7. The image enhancement method of claim 1, further comprising:
attenuating, separating, or removing specular reflections.

8. The image enhancement method of claim 1, further comprising:
for each of the first and second sets of raw pixel data, compensating the intensity values of each first set raw pixel datum for ambient light.

9. The image enhancement method of claim 8, further comprising:
creating a set of ambient pixel data by imaging the object under no illumination other than ambient light; and
subtracting the set of ambient pixel data from each of the first and second sets of raw pixel data.

10. The image enhancement method of claim 1, wherein the object is a security document and the image capture device is a security document reader.

11. The image enhancement method of claim 10, wherein the security document is an identity document or a fiduciary document.

12. The image enhancement method of claim 10, wherein the security document is a passport, an identification card, or a driver's license.

13. The image enhancement method of claim 1, wherein the first position is different from the second position.

14. The image enhancement method of claim 13, wherein the first position is at a first angle relative to the object, and wherein the second position is at a second angle relative to the object.

* * * * *